(12) United States Patent
Jung (10) Patent No.: US 9,001,197 B2
(45) Date of Patent: Apr. 7, 2015

(54) STEREOSCOPIC IMAGE DISPLAY DEVICE

(75) Inventor: Sungmin Jung, Incheon (KR)

(73) Assignee: LG Display Co., Ltd., Seoul (KR)

( * ) Notice: Subject to any disclaimer, the term of this patent is extended or adjusted under 35 U.S.C. 154(b) by 892 days.

(21) Appl. No.: 12/632,748

(22) Filed: Dec. 7, 2009

(65) Prior Publication Data

US 2010/0302354 A1    Dec. 2, 2010

(30) Foreign Application Priority Data

May 29, 2009  (KR) .......................... 10-2009-0047682

(51) Int. Cl.
*H04N 13/04* (2006.01)
*G09G 3/00* (2006.01)

(52) U.S. Cl.
CPC ............ *H04N 13/0486* (2013.01); *G09G 3/003* (2013.01); *G09G 2300/023* (2013.01); *G09G 2310/08* (2013.01); *H04N 13/0438* (2013.01)

(58) Field of Classification Search
USPC ....................... 348/58; 353/10, 8; 345/96, 204
IPC ........................................................ G03B 21/00
See application file for complete search history.

(56) References Cited

U.S. PATENT DOCUMENTS

| | | | |
|---|---|---|---|
| 5,686,975 A | 11/1997 | Lipton | |
| 6,046,787 A | 4/2000 | Nishiguchi | |
| 6,437,915 B2 | 8/2002 | Moseley et al. | |
| 6,446,962 B1 | 9/2002 | Toyoda et al. | |
| 7,889,188 B2 * | 2/2011 | Hwang | 345/204 |
| 2006/0152679 A1 * | 7/2006 | Kim et al. | 353/10 |
| 2006/0290888 A1 * | 12/2006 | Jung et al. | 353/8 |
| 2007/0063952 A1 * | 3/2007 | Oku et al. | 345/96 |
| 2007/0085902 A1 | 4/2007 | Walker et al. | |
| 2007/0229951 A1 | 10/2007 | Jung et al. | |
| 2008/0094333 A1 * | 4/2008 | Oh et al. | 345/89 |
| 2009/0066864 A1 * | 3/2009 | Koyama et al. | 349/15 |

FOREIGN PATENT DOCUMENTS

| | | |
|---|---|---|
| JP | 3-134648 A | 6/1991 |
| JP | 7-234379 A | 9/1995 |
| KR | 10-2007-0099143 A | 10/2007 |
| WO | WO 98/44746 A2 | 10/1998 |
| WO | WO 01/18589 A1 | 3/2001 |

* cited by examiner

*Primary Examiner* — Thao X Le
*Assistant Examiner* — Long Le
(74) *Attorney, Agent, or Firm* — Birch, Stewart, Kolasch & Birch, LLP

(57) ABSTRACT

This document discusses a stereoscopic image display device. In the stereoscopic image display device, a display device displays first image data during an $N^{th}$ (where N is a positive integer) frame period and displays second image data during an $(N+1)^{th}$ frame period. A polarization conversion device converts light which is output from the display device into first polarized light in response to a first driving voltage during the $N^{th}$ frame period and converts light which is output from the display device into a second polarized light in response to a second driving voltage during the $(N+1)^{th}$ frame period. The phase of a point of time at which scanning of at least one of the first and second image data starts is differently synchronized with the phase of a point of time at which scanning of at least one of the first and second driving voltage starts.

10 Claims, 11 Drawing Sheets

| t=0 | t1 | t2 | ... | tN-1 | 1Tf | | | | ... | | | 2Tf | | | ... |
|---|---|---|---|---|---|---|---|---|---|---|---|---|---|---|---|
| 0 | 1 | 1 | ... | 1 | 1 | 1 | 0 | 0 | ... | 0 | 0 | 0 | 1 | 1 | ... |
| 0 | 0 | 1 | ... | 1 | 1 | 1 | 1 | 0 | ... | 0 | 0 | 0 | 0 | 1 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 1 | 1 | 1 | 1 | 1 | ... | 0 | 0 | 0 | 0 | 0 | ... |
| 0 | 0 | 0 | ... | 0 | 1 | 1 | 1 | 1 | ... | 1 | 0 | 0 | 0 | 0 | ... |
| 0 | 0 | 0 | ... | 0 | 0 | 1 | 1 | 1 | ... | 1 | 1 | 0 | 0 | 0 | ... |

# STEREOSCOPIC IMAGE DISPLAY DEVICE

This application claims the benefit of Korean Patent Application No. 10-2009-0047682 filed on May 29, 2009, which is hereby incorporated by reference.

BACKGROUND

1. Field

This document relates to a stereoscopic image display device.

2. Related Art

Techniques for stereoscopic image display devices are classified into a stereoscopic technique and an autostereoscopic technique.

The stereoscopic technique uses parallax images of the left and right eyes having a high three-dimensional effect and comprises a stereoscopic method and an autostereoscopic method both of which are being put to practical use. The stereoscopic method is used to display the left and right parallax images on a direct-view display device or a projector in a time-division manner or by changing the polarization directions of the left and right parallax images and to implement a stereoscopic image using the polarization glasses or the liquid crystal shutter glasses. In the autostereoscopic method, in general, a polarizing plate, such as a parallax barrier for separating the optical axes of the left and right parallax images, is placed in front or at the rear of a display screen.

In the stereoscopic method, a switching retarder for converting the polarization characteristic of light which is incident on the polarization glasses can be placed over the display device. The stereoscopic method is used to alternately display a left-eye image and a right-eye image on the display device and to convert the polarization characteristic of incident light on the polarization glasses through the switching retarder. Accordingly, the stereoscopic method can implement a stereoscopic image without a reduction in resolution by time-dividing the left-eye image and the right-eye image.

A liquid crystal display (LCD) can be used as a display device of the stereoscopic image display device. The LCD is configured to display an image by sequentially writing data from the first (top) line to the last (bottom) line of a screen. Meanwhile, a conventional stereoscopic image display device is driven in such a way that the on/off timings of a switchable retarder and scan electrodes formed in a display device (e.g., a liquid crystal display device) have the same duty ratio. When implementing the stereoscopic image display device, if the response characteristics of the on/off timings of the switchable retarder and the scan electrodes formed in the display device are asymmetrical to each other, there occurs a difference in the transmittance between the left eye and the right eye. Accordingly, the conventional stereoscopic image display device is required to solve crosstalk between a left-eye image and a right-eye image which occurs because of increasing intersection periods between the switchable retarder and the display device.

SUMMARY

An aspect of this document is to provide a stereoscopic image display device for implementing a 3-D image by displaying a first image data and a second image data in a time-dividing manner, comprising a display device displaying the first image data during an $N^{th}$ (where N is a positive integer) frame period and displaying the second image data during an $(N+1)^{th}$ frame period; and a polarization conversion device converting light which is output from the display device into a first polarized light in response to a first driving voltage during the $N^{th}$ frame period and converting light which is output from the display device into a second polarized light in response to a second driving voltage during the $(N+1)^{th}$ frame period. The phase of a point of time at which scanning of at least one of the first and second image data starts is differently synchronized with the phase of a point of time at which scanning of at least one of the first and second driving voltage starts.

Another aspect of this document is to provide a stereoscopic image display device, comprising a display device configured to comprise gate lines classified into a plurality of groups and to display, in a time-dividing manner, a left-eye image and a right-eye image in response to on/off timing voltages supplied to the gate lines; polarization glasses configured to have different polarization characteristics for left and right eyes; a polarization conversion device disposed between the display device and the polarization glasses and configured to comprise scan lines classified into a plurality of groups and to convert a polarization characteristic of light which travels in a direction of the polarization glasses in response to on/off timing voltages supplied to the scan lines; a driving unit configured to supply the scan lines with a first voltage which is synchronized with the left-eye image displayed in the display device and to supply the scan lines with a second voltage is synchronized with the right-eye image displayed in the display device; a first control unit configured to supply the display device with data of the left-eye image and data of the right-eye image and to control the driving unit so that voltages of the scan lines change from the first voltage to the second voltage along a line where the left-eye image and the right-eye image are changed in the display device; and a second control unit configured to vary a duty ratio of on/off timings of the gate lines and a duty ratio of on/off timings of the scan lines so that the duty ratio of on/off timings of the gate lines differs from the duty ratio of on/off timings of the scan lines, when the left-eye image and the right-eye image are displayed in the display device.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION

Reference will now be made in detail to embodiments of this document examples of which are illustrated in the accompanying drawings.

Hereinafter, one or more implementations of this document are described in detail.

Referring to FIGS. 1 to 5, a stereoscopic image display device according to an exemplary embodiment of this document comprises an image supply unit 110, a first control unit 120, a second control unit 125, a first driving unit 130, a second driving unit 135, a display device 150, a polarization conversion device 160, and polarization glasses 170.

Figure 1:
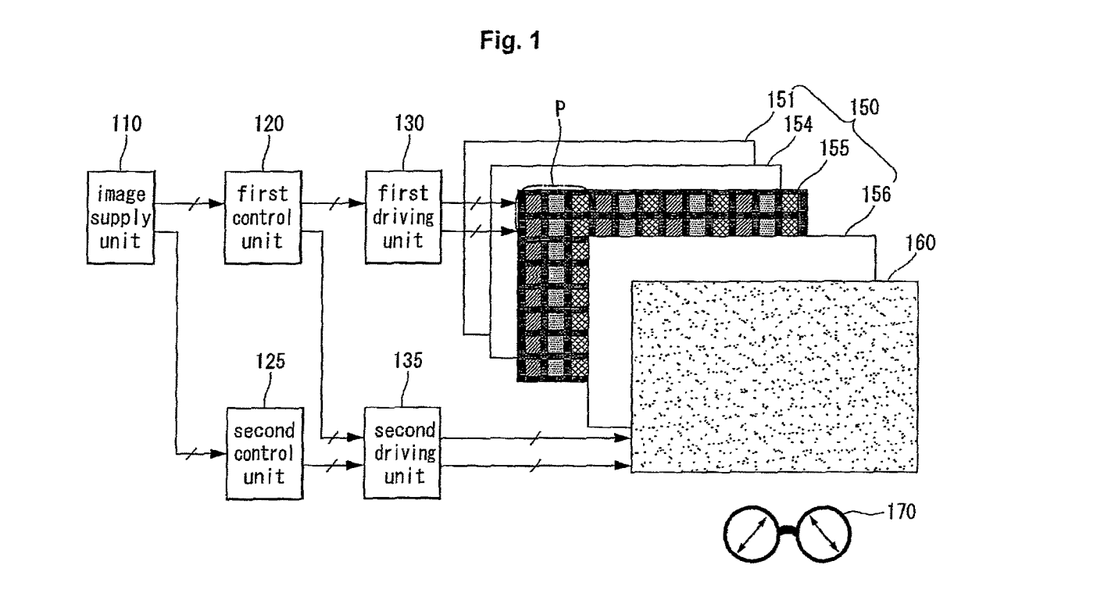
FIG. 1 shows a schematic configuration of a stereoscopic image display device according to an exemplary embodiment of this document.

The image supply unit 110 is configured to supply the first control unit 120 with image data having a two-dimensional (2-D) format in the 2-D mode and right and left image data having a three-dimensional (3-D) format in the 3-D mode. Further, the image supply unit 110 is configured to supply the first control unit 120 and the second control unit 125 with time signals, such as a vertical sync signal vsync, a horizontal sync signal Hsync, a data enable signal DE, a main clock, and a low voltage GND. The image supply unit 110 selects the 2-D mode or the 3-D mode according to user choice through a user interface. The user interface may comprise user input means, such as an on-screen display (OSD), a remote controller, a keyboard, or a mouse. The image supply unit 110 may divide the image data into right-eye image data and left-eye image data, which have the 3-D format, according to a left-eye image and a right-eye image which are displayed in the display device 150 and may encode the divided image data.

The first control unit 120 is configured to supply the display device 150 with first image data and second image data. The first image data may be selected as left-eye image data, and the second image data may be selected as right-eye image data. The first control unit 120 is configured to supply the first driving unit 130 with the image data which is received from the image supply unit 110 in the form of a frame frequency of 60×n (where n is a positive integer of 2 or more) Hz. In the 3-D mode, the first control unit 120 alternately supplies the first driving unit 130 with the left-eye image data and the right-eye image data. The first control unit 120 multiplies the frame frequency of an input image n times in order to increase the frequency of a time control signal for controlling the operating times of the first and second driving units 130 and 135.

Figure 3:
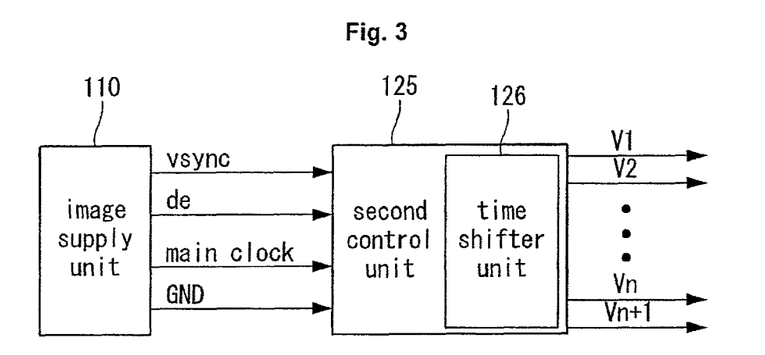
FIG. 3 shows a schematic configuration of a second control unit shown in FIG. 1.
Figure 4:
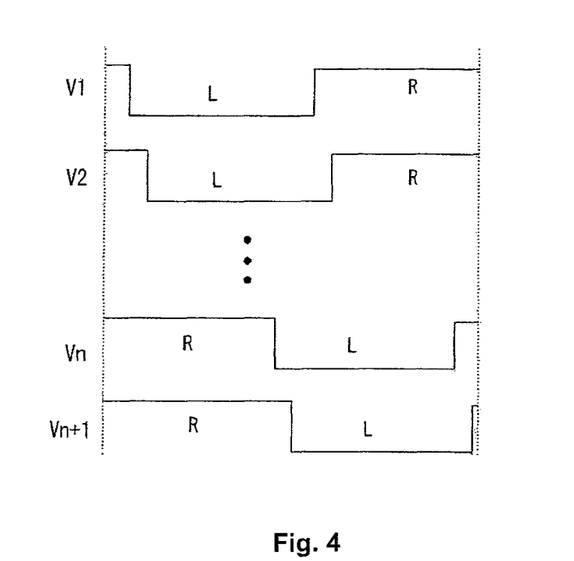
FIG. 4 shows waveforms of signals output through the second control unit.

The second control unit 125 controls the second driving unit 135 such that voltages of scan lines 164 formed in the polarization conversion device 160 change from a first driving voltage to a second driving voltage according to a line at which a left-eye image and a right-eye image are changed in the display device 150. To this end, the second control unit 125 receives 2D and 3D image data and time signals which are synchronized with the 2D and 3D image data from the image supply unit 110, converts the time signals so that the phase of a point of time at which scanning of at least one of the image data starts is differently synchronized with the phase of a point of time at which scanning of at least one of the driving voltages V1, . . . , Vn+1 starts, and controls scanning of the scan lines 164 through the second driving unit 135. To this end, the second control unit 125 may comprise a time shifter unit 126 configured to receive signals which are supplied from the image supply unit 110 to the display device 150 and signals (e.g., vsync, de, a main clock, and GND) for synchronization and to vary the driving voltages V1, . . . , Vn+1 on the basis of the synchronization signals such that on/off timings of the scan lines 164 differ from a point of time at which scanning of image data starts. Accordingly, the duty ratio of on/off timings of gate lines Gm and Gm+1 formed in the display device 150 becomes different from the duty ratio of on/off timings of the scan lines 164 formed in the polarization conversion device 160. For example, if, when the display device 150 displays a left-eye image and a right-eye image, the duty ratio of on/off timings of the scan lines 164 varies, the off timing of the scan lines 164 becomes longer or shorter than the on timing of the scan lines 164. Accordingly, the second control unit 125 can vary the off timing of the scan lines 164 so that it precedes the off timing of the gate lines Gm and Gm+1 when the scan lines 164 are turned on or off and can vary the on timing of the scan lines 164 so that it follows the on timing of the gate lines Gm and Gm+1. The reason why the duty ratio of on/off timings of the scan lines 164 is changed using the second control unit 125, as described above, is described in detail later.

Figure 2:
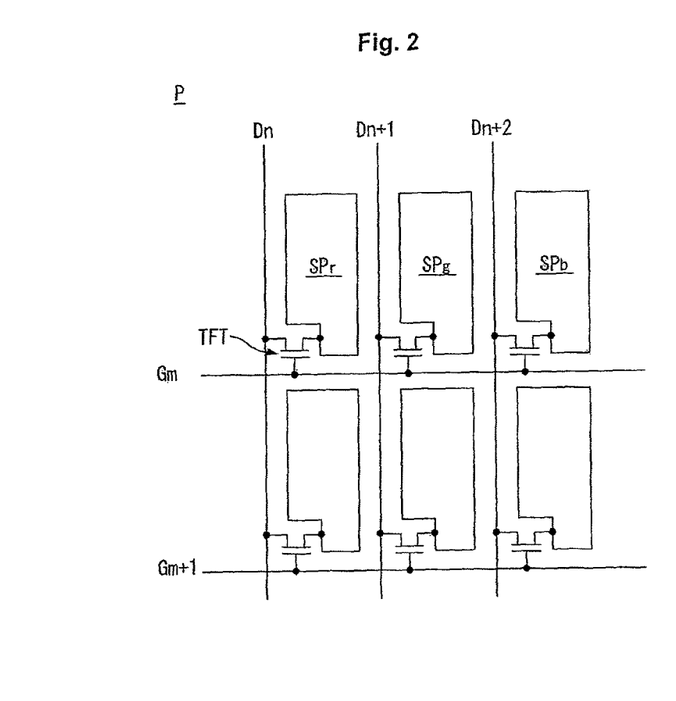
FIG. 2 is a diagram showing the subpixels of a display device shown in FIG. 1.

The first driving unit 130 comprises a data driving circuit connected to data lines Dn, . . . , Dn+2 and a gate driving circuit connected to the gate lines Gm and Gm+1. The data driving circuit converts digital video data which is received from the first control unit 120 into positive/negative polarity analog video data voltages and supplies the converted voltages to the data lines Dn, Dn+2, under the control of the first control unit 120. The gate driving circuit sequentially supplies a gate pulse (or a scan pulse) to the gate lines Gm and Gm+1 under the control of the first control unit 120.

The second driving unit 135 receives, from the second control unit 125, signals which have been converted such that a phase of at least one of the image data which is supplied to the display device 150 at a point of time at which scanning of the image data starts is differently synchronized with a phase of at least one of the driving voltages V1, Vn+1 at a point of time at which scanning of the driving voltage starts. The second driving unit 135 finally changes the driving voltages V1, Vn+1 on the basis of the signals that are received from the second control unit 125 such that on/off timings of the scan lines 164 are different from the point of time at which scanning of the image data starts and sequentially supplies the changed driving voltages to the scan lines 164 of the polarization conversion device 160. To this end, the second driving unit 135 may generate a three-level switching voltage Von/off so that the driving voltages V1, . . . , Vn+1 are synchronized with a left-eye image data L and a right-eye image data R and may sequentially supply the switching voltage Von/off to the scan lines 164 of the polarization conversion device 160 under the control of the first control unit 120 and the second control unit 125. The second driving unit 135 shifts the switching voltage Von/Voff which is supplied to the scan lines 164 according to the boundary of the left-eye image data and the right-eye image data in the display device 150. The second driving unit 135 may be implemented using a multiplexer array for selecting the switching voltage Voff which is synchronized with the left-eye image data displayed in the display device 150 and positive/negative polarity voltages +Von/−Von which are synchronized with the right-eye image data displayed in the display device 150 under the control of the first and second control units 120 and 125. Alternatively, the second driving unit 135 may be implemented using a shift register, a level shifter for shifting the output of the shift register to the switching voltage Voff and the positive/negative polarity voltages +Von/−Von, and so on. Alternatively, the second driving unit 135 may be implemented using any kind of an analog to digital circuit which is able to sequentially supply the switching voltage Voff and the positive/negative polarity voltages +Von/−Von to the scan lines 164 of the polarization conversion device 160.

The display device 150 displays the first image data during an $N^{th}$ (where N is a positive integer) frame period and the second image data during an $(N+1)^{th}$ frame period. The display device 150 may be implemented using a liquid crystal display (LCD), a field emission display (FED), a plasma display panel (PDP), or a flat display device, such as an electroluminescence (EL) device comprising an organic light emitting diode (OLED). It is to be noted that a LCD is hereinafter described as an example of the display device 150, but the display device 150 is not limited to the LCD, but may be implemented using a flat display device. The display device 150 comprises a thin film transistor (hereinafter referred to as a 'TFT') substrate and a color filter substrate. A liquid crystal layer is formed between the TFT substrate and the color filter substrate. The data lines Dn, . . . , Dn+2 and the gate lines Gm and Gm+1 are formed on the rear glass substrate of the TFT substrate so that they intersect each other. The data lines Dn, . . . , Dn+2 and the gate lines Gm and Gm+1 are formed on the rear glass substrate of the TFT substrate so that they are orthogonal to each other. Further, subpixels SPr, SPg, and SPb which are defined by the data lines Dn, . . . , Dn+2 and the gate lines Gm and Gm+1 are formed in a matrix form on the rear glass substrate. A TFT is formed at the intersection of each of the data lines Dn, . . . , Dn+2 and the gate lines Gm and Gm+1 supplies the pixel electrode of a liquid crystal cell with a data voltage that is supplied via the data lines Dn, . . . , Dn+2 in response to the scan pulse received from the gate line Gm. To this end, the gate electrode of the TFT is connected to the gate line Gm, and the source electrode of the TFT is connected to the data line Dn. The drain electrode of the TFT is connected to the pixel electrode of the liquid crystal cell. A common voltage is supplied to a common electrode that is opposite to the pixel electrode. The color filter substrate comprises black matrices and a color filter which are formed on the front glass substrate of the TFT. The common electrode is formed on the front glass substrate in a vertical electric field driving method, such as a twisted nematic (TN) mode and a vertical alignment (VA) mode, and is formed on the rear glass substrate along with the pixel electrode in a horizontal electric field driving method, such as an in-plane switching (IPS) mode and a fringe field switching (FFS) mode. Polarizing plates 154 and 156 are attached to the front and rear glass substrates of the display device 150, respectively. An orientation film for determining a pre-tilt angle of a liquid crystal is formed in each of the polarizing plates 154 and 156 of the display device 150. The front polarizing plate 156 has a light absorbing axis, which is equal to the light absorbing axis of the left-eye polarizing filter of the polarization glasses 170, and determines the polarization characteristic of light which is incident on the polarization conversion device 160 along the light absorbing axis. The rear polarizing plate 154 determines the polarization characteristic of light which is incident on the display device 150. Spacers for maintaining the cell gap of the liquid crystal layer are formed between the front glass substrate and the rear glass substrate of the display device 150. The liquid crystal mode of the display device 150 may comprise any kind of a liquid crystal mode as well as the TN mode, the VA mode, the IPS mode, or the FFS mode. Further, the display device 150 may be implemented using any kind of a liquid crystal display device, such as a transmissive liquid crystal display device, a semi-transmissive liquid crystal display device, or a reflective liquid crystal display device. The transmissive liquid crystal display device and the semi-transmissive liquid crystal display device require a backlight unit 151, as shown in FIG. 1.

Figure 5:
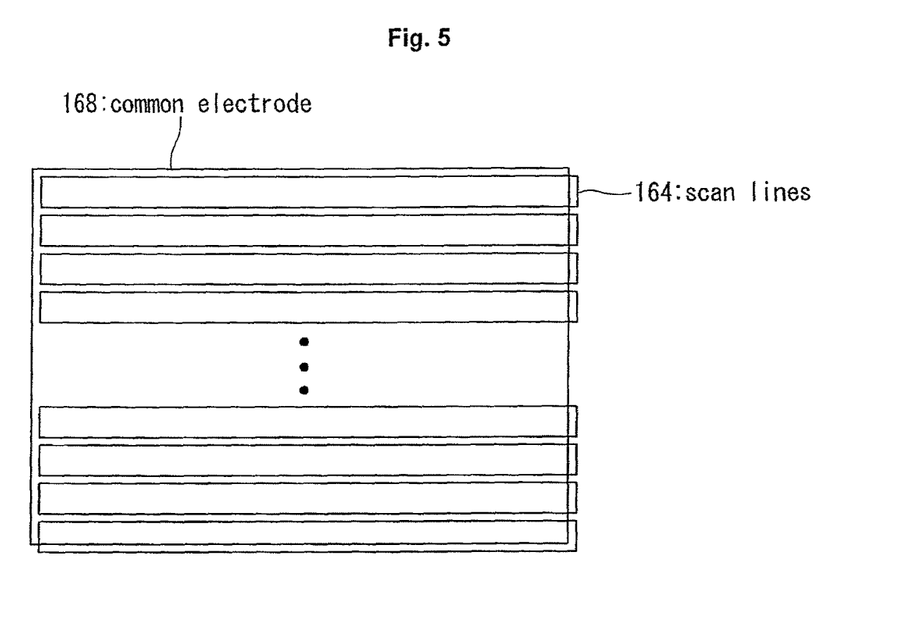
FIG. 5 is a diagram showing the electrodes of a polarization conversion device shown in FIG. 1.

The polarization conversion device 160 is configured to convert light which is received from the display device 150 into first polarized light in response to the first driving voltage during the $N^{th}$ frame period and to convert light which is received from the display device 150 into second polarized light in response to the second driving voltage during the $(N+1)^{th}$ frame period. To this end, the polarization conversion device 160 comprises a front glass substrate (or a transparent substrate) and a rear glass substrate (or a transparent substrate) which are opposite to each other with the liquid crystal layer intervened therebetween. The common electrode 168 is formed in the front glass substrate, and the scan lines 164 classified into a plurality of groups are formed in the rear glass substrate in a traverse stripe pattern. The scan lines 164 formed in the polarization conversion device 160 are classified into some groups and arranged in the same direction so that they have a corresponding relation of 1:N stages (where N is an even number) for the gate lines Gm and Gm+1 which are formed in the display device 150. For example, assuming that the number of gate lines Gm and Gm+1 of the display device 150 is 1080 and the number of scan lines 164 of the polarization conversion device 160 is 90, one scan line is formed to correspond to twelve gate lines. The liquid crystal layer formed between the rear glass substrate and the front glass substrate is made of electrically controlled birefringence (ECB) liquid crystals which have a half-wave plate ($\lambda/2$) optical axis characteristic when the scan lines 164 are in an off state. A common voltage, having an equipotential as the common voltage which is supplied to the common electrode of the display device 150, is supplied to the common electrode 168. The switching voltage Voff, having an equipotential as the common voltage supplied to the common electrode 168, is supplied to the scan lines 164 before (or after) the right-eye image (or the left-eye image) is displayed in lines of the display device 150 which are opposite to the scan lines 164. The positive/negative polarity voltages +Von/−Von, having a potential difference with the common voltage supplied to the common electrode 168, are alternately supplied to the scan lines 164 before (or after) the right-eye image (or the left-eye image) is displayed in lines of the display device 150 which are opposite to the scan lines 164. Accordingly, the switching on or off voltage having a three-step voltage level is supplied to the scan lines 164 such that an observer can see the right and left-eye images displayed in the display device 150 through the polarization glasses 170. The positive/negative polarity voltages +Von/−Von which are generated on the basis of the common voltage function to prevent the liquid crystals from being deteriorated because of a DC voltage. The common voltage supplied to the common electrode of the display device 150 and the common voltage Vcom or the switching voltage Voff which is supplied to the common electrode 168 and the scan lines 164 of the polarization conversion device 160 may be set to 7.5 V, the positive polarity voltage +Von supplied to the scan lines 164 of the polarization conversion device 160 may be set to 15 V, and the negative polarity voltage −Von supplied to the scan lines 164 of the polarization conversion device 160 may be set to 0 V.

The polarization glasses 170 comprises a polarized filter for the left eye and a polarized filter for the right eye which have different optical absorbing axes such that the polarization characteristic of the left eye and the polarization characteristic of the right eye differ from each other.

In the exemplary embodiment, the image supply unit 110, the first control unit 120, the second control unit 125, the first driving unit 130, and the second driving unit 135 are illustrated to have independent blocks. It is, however, to be noted that one or more of the above elements may be integrated into a single chip or some of the above elements, which are configured to perform functions having a high mutual dependence, may be formed in respective chips.

Figure 6:
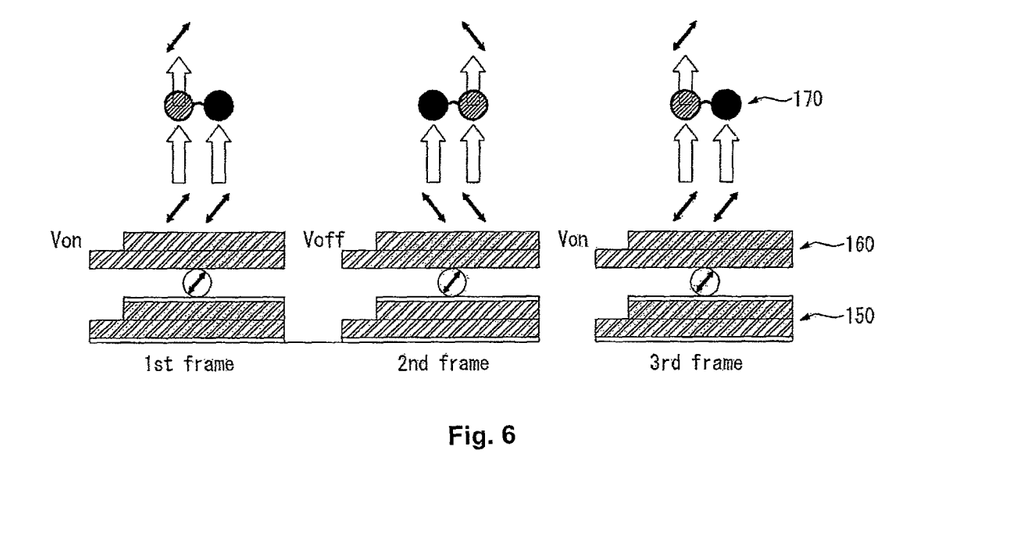
FIG. 6 is a diagram showing examples of 3-D mode operations of the stereoscopic image display device according to an exemplary embodiment of this document.

FIG. 6 is a diagram showing, on a frame basis (first to third frames), how the left and right-eye images which have passed through the display device 150 and the polarization conversion device 160 can be seen through the polarization glasses 170. The display device 150 alternately displays the left and right-eye images in the 3-D mode and transmits light of the left and right-eye images via the front polarizing plate 156 as left polarized light. When the switching voltage Voff is supplied to the scan lines 164, the polarization conversion device 160 delays the phase of the left polarized light which is received from the display device 150 by 90° and transmits right polarized light toward the polarization glasses 170. When the positive/negative polarity voltages +Von/−Von are supplied to the scan lines 164, the polarization conversion device 160 transmits the left polarized light which is received from the display device 150 without phase delay. Accordingly, assuming that the display device 150 and the polarization conversion device 160 are driven at the frame frequency of 120 Hz, the left-eye image is displayed in the display device 150 during odd-numbered frame periods and the right-eye image is displayed in the display device 150 during even-numbered frame periods. Thus, an observer who wears the polarization glasses 170 can see the left-eye image through his left eye during odd-numbered frame periods and the right-eye image through his right eye during even-numbered frame periods. The above left polarized light may be any one of vertical linearly polarized light (or a horizontal linearly polarized light) and left circularly polarized light (or right circularly polarized light) or may be any one of horizontal linearly polarized light (or vertical linearly polarized light) and right circularly polarized light (or horizontal linearly polarized light) which have an optical axis intersecting the optical axis of right polarized light. Meanwhile, the display device 150 displays an image of a 2-D format in the 2-D mode. When the display device 150 displays an image of a 2-D format, an observer can see the 2-D image by taking off the polarization glasses 170.

Figure 7:
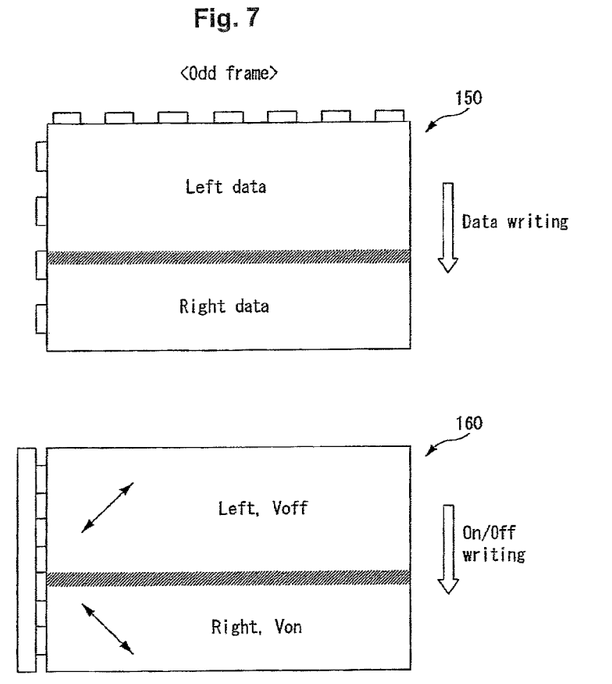
FIGS. 7 and 8 are diagrams illustrating a scanning method using the display device and the polarization conversion device.
Figure 8:
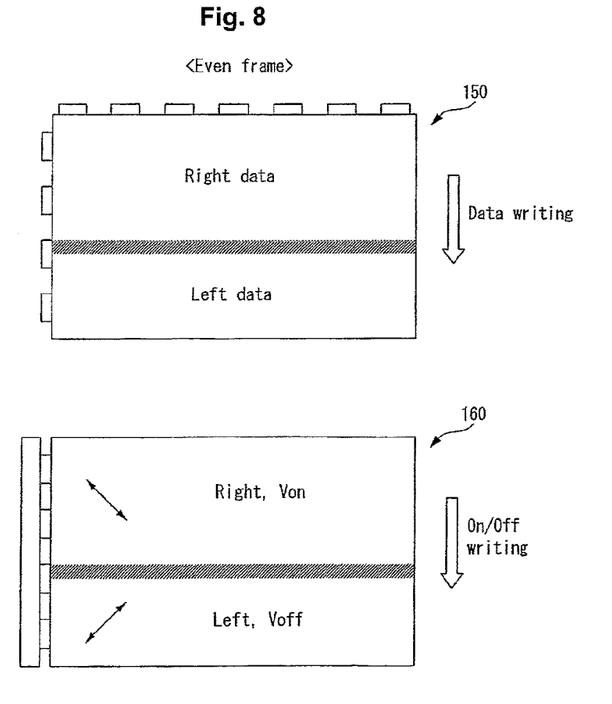

Referring to FIGS. 7 and 8, the display device 150 sequentially writes the data of the left-eye image on a line basis in the 3-D mode. Here, the display device 150 sequentially writes the data of the right-eye image on a line basis in a next frame period. Before the writing of the left-eye image (or the right-eye image), the liquid crystal cells maintain the data of the right-eye image (or the left-eye image) which has been charged in a previous frame period.

The second driving unit 135 controls voltages which are supplied to the scan lines 164 of the polarization conversion device 160 under the control of the first and second control units 120 and 125, as in the logic table shown in FIG. 7. In FIG. 7, '0' indicates the switching voltage Voff which is supplied to the scan lines 164 in synchronization with a data scan time of the left-eye image that is written into the display device 150. '1' indicates the positive/negative polarity voltages +Von/−Von which are supplied to the scan lines 164 in synchronization with a data scan time of the right-eye image that is written into the display device 150.

Figure 9:
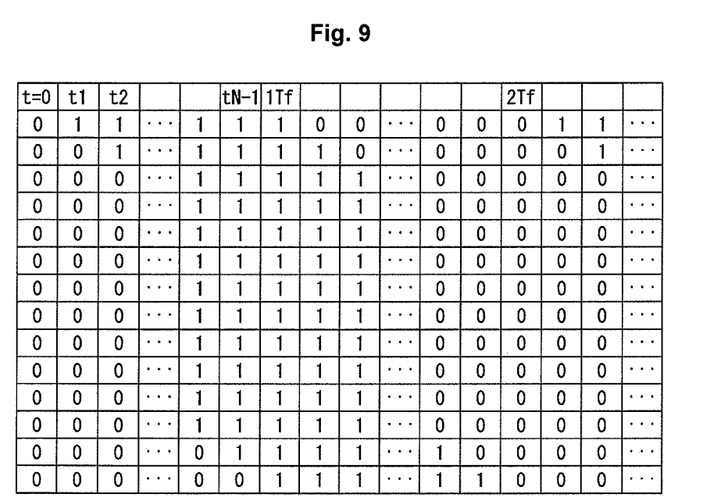
FIG. 9 is a table showing changes in the logical values of a control signal for controlling voltages which are supplied to the scan lines of the polarization conversion device.

In FIG. 9, the lines of the table correspond to the respective scan lines 164 of the polarization conversion device 160, and 't=0, . . . , 2TF,' at the top of the table indicate the lapse of time. In FIG. 9, at '1Tf', the switching voltage Voff is supplied to all the scan lines 164, comprising the first scan line at the top of the table and the last scan line at the bottom of the table. If the right-eye image is scanned at the display device 150 starting from the first scan line, the positive/negative polarity voltages +Von/−Von start being supplied to the scan lines 164 line by line in the scan direction. Accordingly, the voltages supplied to the scan lines 164 change from the switching voltage Voff to the positive/negative polarity voltages +Von/−Von along a line at which an image displayed in the display device 150 changes from a left-eye image to a right-eye image. Further, the voltages supplied to the scan lines 164 change from the positive/negative polarity voltages +Von/−Von to the switching voltage Voff along a line at which an image displayed in the display device 150 changes from a right-eye image to a left-eye image. A case where data of the left-eye image is first displayed is taken as an example in the above description. It is, however, to be noted that, if data of the right-eye image is first displayed, the voltages supplied to the scan lines 164 may differ from those of the above example.

Figure 10:
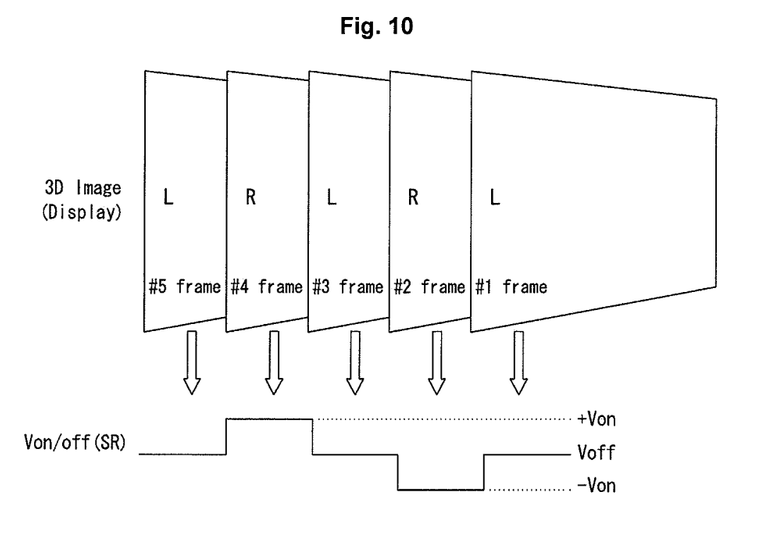
FIG. 10 is a diagram showing voltages which are supplied to the scan lines of the polarization conversion device in response to left and right-eye images displayed on the display device.

In FIG. 10, 'Von/Voff (SR)' indicates a polarized switching voltage which is supplied to turn on or off the scan lines 164 of the polarization conversion device 160. In order to convert the polarization characteristic of light which is generated by the left-eye image displayed in the display device 150 as in FIG. 10, the switching voltage Voff is supplied to the scan lines 164 of the polarization conversion device 160. On the other hand, in order to convert the polarization characteristic of light which is generated by the right-eye image displayed in the display device 150, the positive/negative polarity voltages +Von/−Von are supplied to the scan lines 164 of the polarization conversion device 160. Thus, an observer may feel ortho-stereoscopy resulting from binocular disparity through the polarization glasses 170 because of such an operating characteristic of the display device 150 and the polarization conversion device 160.

Figure 11:
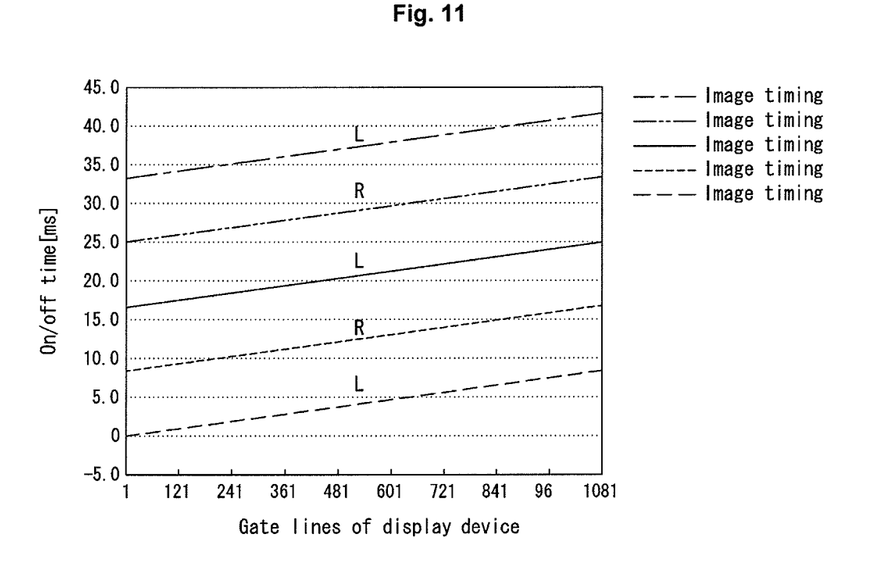
FIGS. 11 and 12 are diagrams showing the duty ratio of on/off timings of the gate lines of the display device and the duty ratio of on/off timings of the scan lines of the polarization conversion device in the process of FIG. 10.
Figure 12:
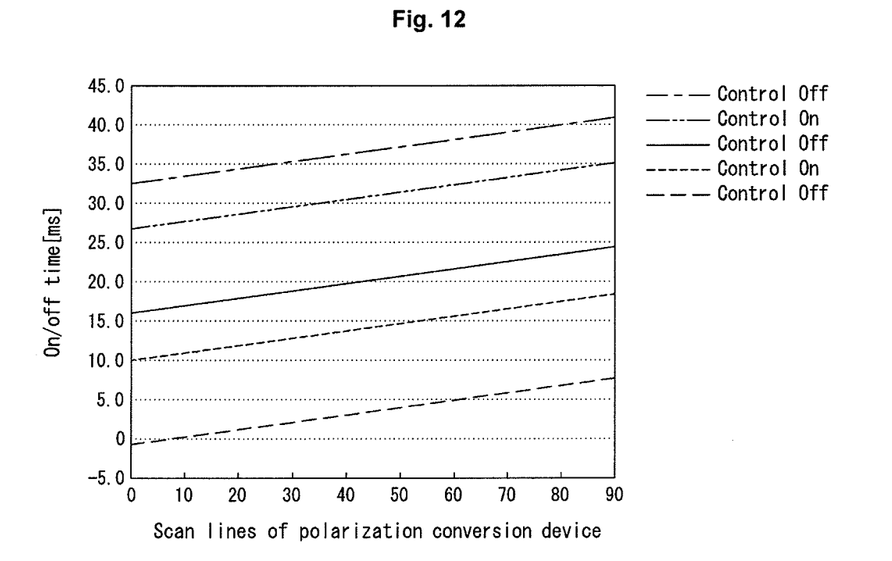

Referring to FIGS. 11 and 12, the gate lines 1, . . . , 1081 formed in the display device 150 and the scan lines 0, . . . , 90 formed in the polarization conversion device 160 are scanned with the duty ratio of the same on/off timing. At the duty ratio of on/off timings of the gate lines 1, . . . , 1081, a left-eye image L is scanned from '0.0 ms' to '8.3 ms' on the time axis (−5.0, . . . , 45.0) and a right-eye image R is scanned from '8.3 ms' to '16.6 ms' on the time axis (−5.0, . . . , 45.0). The scan lines 0, . . . , 90 formed in the polarization conversion device 160 are scanned before the scanning of the left-eye image L and are scanned after the scanning of the right-eye image R.

Although not shown, unlike the above method, the scan lines 0, . . . , 90 formed in the polarization conversion device 160 may be scanned after the scanning of the left-eye image L and may be scanned before the scanning of the right-eye image R.

Figure 13:
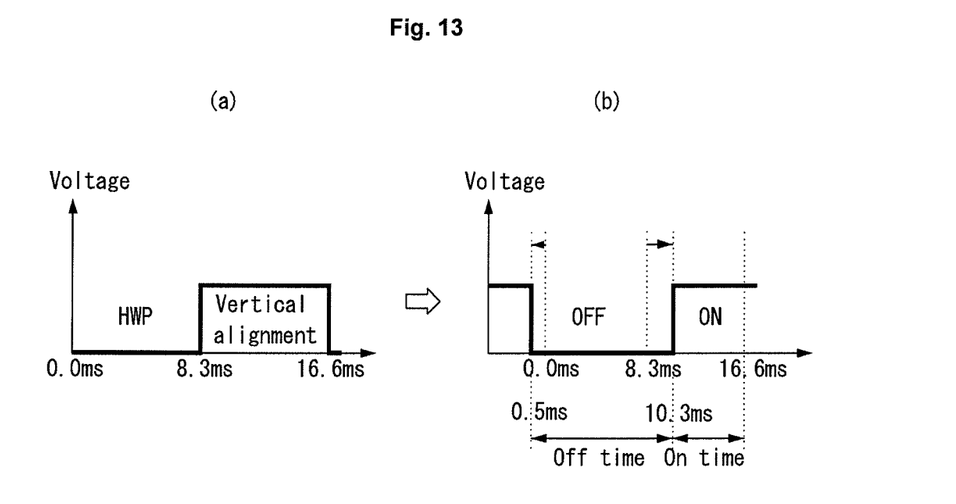
FIG. 13 is a diagram illustrating the duty ratio of on/off timings of the scan lines.

Referring to a conventional driving method shown in FIG. 13(a), the scan lines 0, . . . , 90 formed in the polarization conversion device 160 are scanned at the on/off timing '0.0 ms' so that the scanning time is synchronized with the scanning of the left-eye image L on the time axis (−5.0, . . . , 45.0) and are scanned at the on/off timing '8.3 ms' so that the scanning time is synchronized with the scanning of the right-eye image R. If, as described above, the duty ratio of the on/off timing of the gate lines 1, . . . , 1081 formed in the display device 150 is identical to the duty ratio of the on/off timing of the scan lines 0, . . . , 90 formed in the polarization conversion device 160, crosstalk occurs due to the difference in the transmittance between the display device 150 and the polarization conversion device 160. Such crosstalk is described in more detail later.

Figure 14:
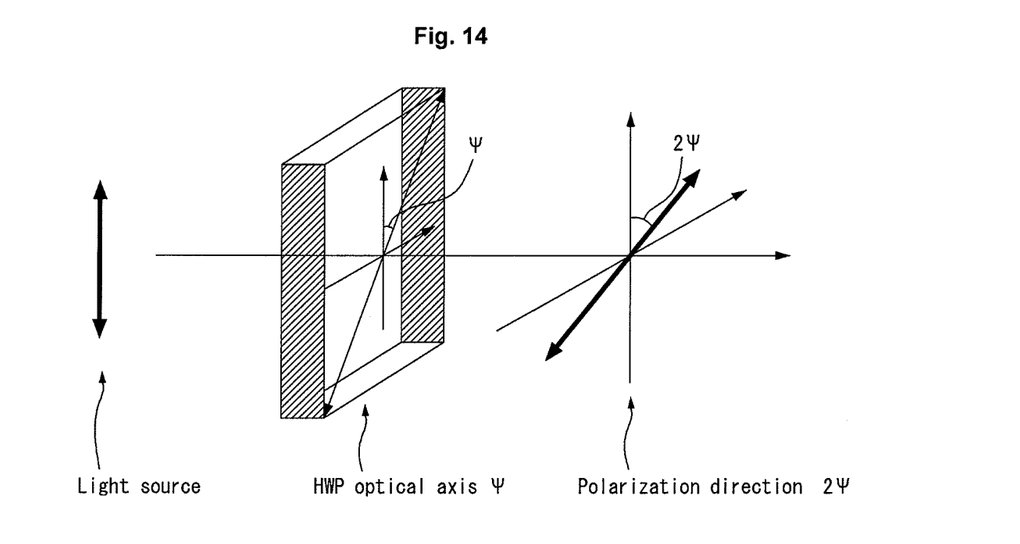
FIG. 14 is a diagram illustrating the optical property of electrically controlled birefringence (ECB) liquid crystals.

In the case where the polarization conversion device 160 is made of ECB liquid crystals as shown in FIG. 14, if a linearly polarized light source is incident at a dihedral angle Ψ between a polarization axis and the optical axis of a half-wave plate (λ/2) (HWP), the polarization direction of the incident light source is rotated in the direction of 2Ψ. The ECB liquid crystals function to polarize the incident light source by 90° because they have a HWP optical axis characteristic in an off state and to transmit the incident light source without polarizing it because they are all vertically oriented in an on state. Accordingly, in the case where the polarization glasses (170) condition and the polarization axis condition of the display device 150 according to the exemplary embodiment are used, the left and right eyes become respective white and black states in an ECB-off state, and the right and left eyes become respective white and black states in an on state. An optical design condition of the ECB liquid crystals may be set up according to liquid crystals on the basis of Δnd=275 nm @ 550 nm light source. Here, "n" indicates the difference in the refractive index between the long axis direction and the short axis direction of the liquid crystals, and "d" indicates the thickness of the liquid crystal cell (i.e., a cell gap).

In accordance with the above description, the ECB liquid crystals being in an off state exhibit a wavelength dispersion property of the HWP and become a factor to cause the leakage of the right eye because the off state corresponds to a period where the right eye becomes black. Meanwhile, the ECB liquid crystals can implement a full black with respect to a monochromatic polarized light source. However, in the case where the polarization conversion device is made of the ECB liquid crystals, it looks as if the polarization conversion device is fully exposed to the entire wavelength because a color filter for RGB is omitted. Accordingly, if the on/off timing of the gate lines formed in the display device 150 and the on/off timing of the scan lines formed in the polarization conversion device 160 are synchronized with each other and driven as in the conventional method shown in FIG. 13(a), the difference in the transmittance occurs between the left eye and the right eye. Consequently, crosstalk is generated between a left-eye image and a right-eye image because of an increased intersection period between the display device 150 and the polarization conversion device 160.

On the other hand, referring to a driving method shown in FIG. 13(b) according to an exemplary embodiment, the scan lines 0, . . . , 90 are scanned '0.5 ms' earlier than the scanning of the left-eye image L on the time axis (−5.0, . . . , 45.0) and are scanned '2.0 ms' later than the scanning of the right-eye image R. The reason why the duty ratio of the on/off timing of the gate lines 1, . . . , 1081 formed in the display device 150 and the duty ratio of the on/off timing of the scan lines 0, . . . , 90 formed in the polarization conversion device 160 are set differently as described above is to solve crosstalk caused by the difference in the transmittance between the display device 150 and the polarization conversion device 160 and to level the transmittance between them.

Experimental examples for solving crosstalk caused by the difference in the transmittance between the display device 150 and the polarization conversion device 160 are described below. In the experimental examples, a case where a stereoscopic image display device, such as that described in the above exemplary embodiment, is taken as an example.

Figure 15:
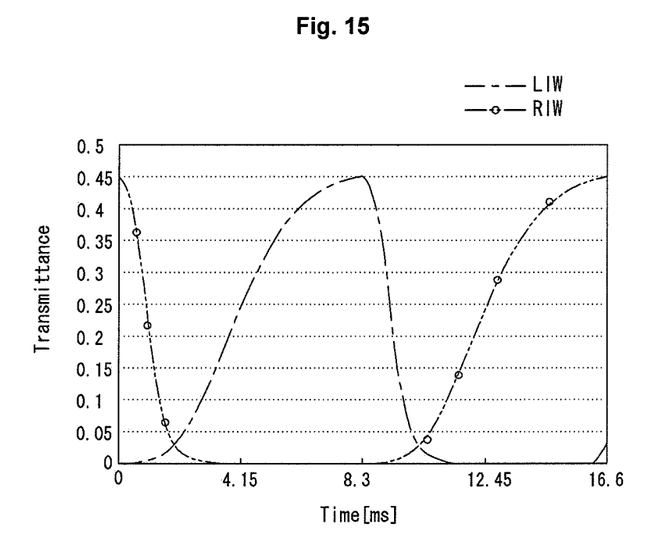
FIG. 15 is a graph showing transmittance response curves of the display device at local points when a left-eye image and a right-eye image are displayed in the form of a white test pattern.
Figure 16:
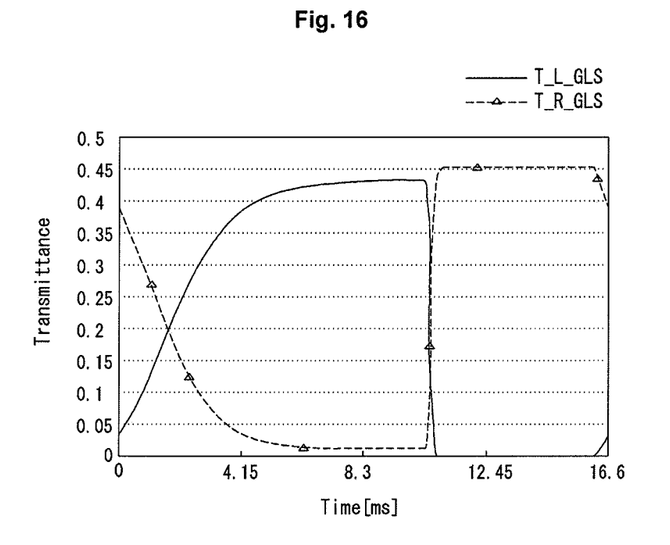
FIG. 16 is a graph showing transmittance response curves when images pass through only the polarization conversion device and left/right eye polarization glasses.
Figure 17:
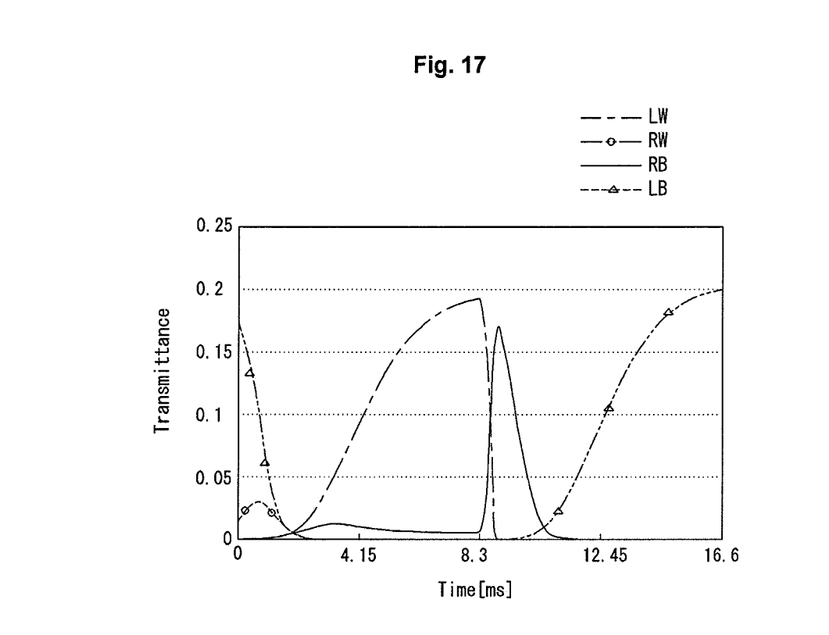
FIG. 17 is a graph showing transmittance response characteristics of light emitted from the display device in the form of the product of the transmittance response characteristics shown in FIGS. 15 and 16 when the light actually enters the left eye and the right eye through the polarization conversion device and the polarization glasses.

Referring to FIGS. 15 to 17, the intensity of radiation in the left eye in a left eye white pattern and the intensity of radiation in the right eye in a right eye white pattern correspond to white. The right eye in the left eye white pattern does not become black, but exhibits a high peak. It is generated when an on timing of the display device 150 intersects an on timing of the right eye of the polarization conversion device 160. The left eye in the right eye white pattern does not become black, but has a relatively small intensity of radiation. Referring to Table 1 and Table 2 below, it can be seen that, when the display device 150 and the polarization conversion device 160 have transmittances, such as that shown in Table 1, not only there occurs a difference in a total of integrated transmittance within a period, but crosstalk (CT) occurs in the left eye and the right eye.

TABLE 1

| | Transmittance | |
|---|---|---|
| | L-frame | R-frame |
| Display device | 0.284 | 0.284 |
| Polarization conversion device | 0.308 | 0.555 |

TABLE 2

| | Total transmittance and crosstalk | |
|---|---|---|
| | Left eye (L) | Right eye (R) |
| White (W) | 0.094 | 0.123 |
| Black (B) | 0.003 | 0.027 |
| Crosstalk (CT) | 2.74% | 17.97% |

In the exemplary embodiment, in order to solve crosstalk resulting from the difference in the transmittance between the display device 150 and the polarization conversion device 160 and to level transmittance between them, which are caused by the conventional driving method shown in FIG. 13(b), the duty ratios of on/off timings of the polarization conversion device 160 are made different. A method of making different the duty ratios may comprise, for example, a method of setting up an equation based on the difference in the transmittance or an experiment based on the difference in the transmittance. Further, in order to make different the duty ratios, if one (e.g., an on timing) of on and off timings of the polarization conversion device is determined and the duty ratio is controlled, the other (e.g., an off timing) of the on and off timings of the polarization conversion device can be predicted.

Figure 18:
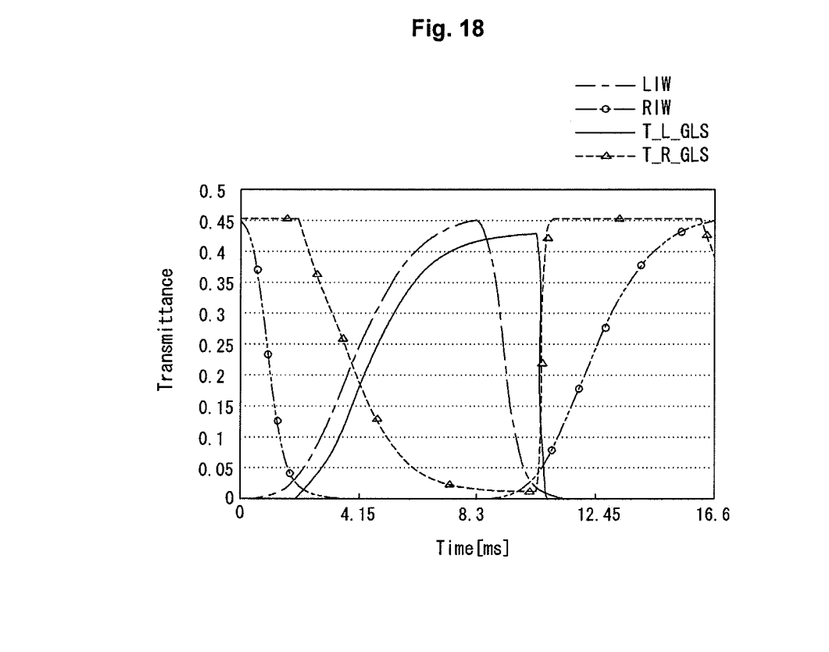
FIG. 18 is a graph showing a transmittance response characteristic of the display device and a transmittance response characteristic, comprising both left and right eye response characteristics obtained by the polarization conversion device, in an experimental process.
Figure 19:
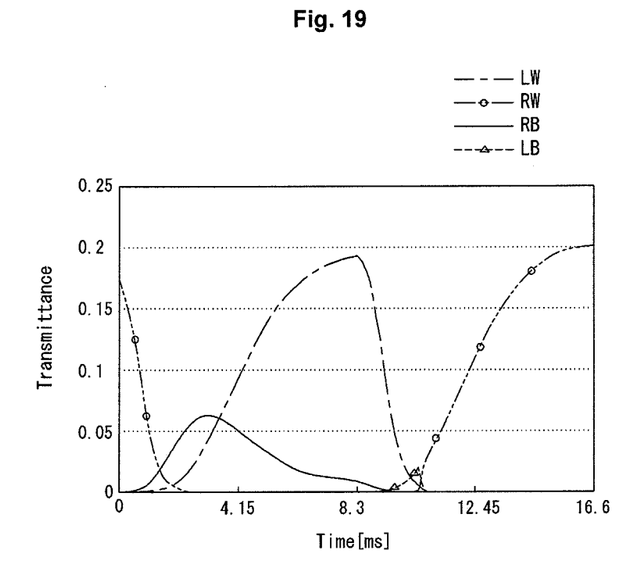
FIG. 19 is a graph showing white and black transmittance response characteristics of the left and right eyes in an experimental process.

In the experimental process, an on timing of the polarization conversion device 160 was moved to the right on the time axis so that it was placed behind as compared with the conventional method on the basis of the time ('0.0 ms') where the left-eye image was first written in the display device 150 using one of the above methods of making different the duty ratios. For example, assuming that the on timing of the polarization conversion device was '8.3 ms' as in FIG. 13(a) (i.e., the conventional driving method), the on timing of the polarization conversion device was moved to '10.3 Ms' as in FIG. 13(b) (i.e., the driving method of the exemplary embodiment). From FIGS. 18 and 19, it can be seen that, when the on timing of the polarization conversion device was '10.3 ms' as described above, leakage was not generated. Nevertheless, it can be seen that there was still the difference in the transmittance (i.e., the crosstalk (CT) of the left eye=3.26% and the crosstalk (CT) of the right eye=19.14%). This is because, if the duty ratios of on/off timings of the polarization conversion device were set to '8.3 ms/'8.3 ms', the right eye leakage was generated at the portion where the rising time and the falling time overlapped with each other.

Figure 20:
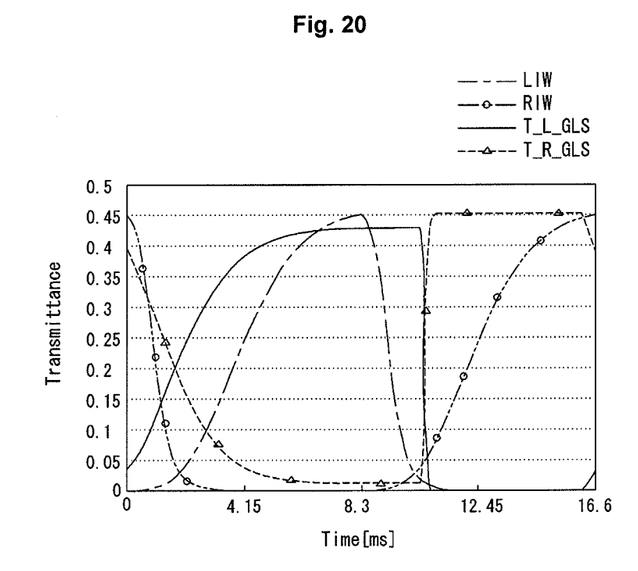
FIG. 20 is a graph showing a transmittance response characteristic of the display device and a transmittance response characteristic, comprising both left and right eye response characteristics obtained by the polarization conversion device, according to an exemplary embodiment of this document.
Figure 21:
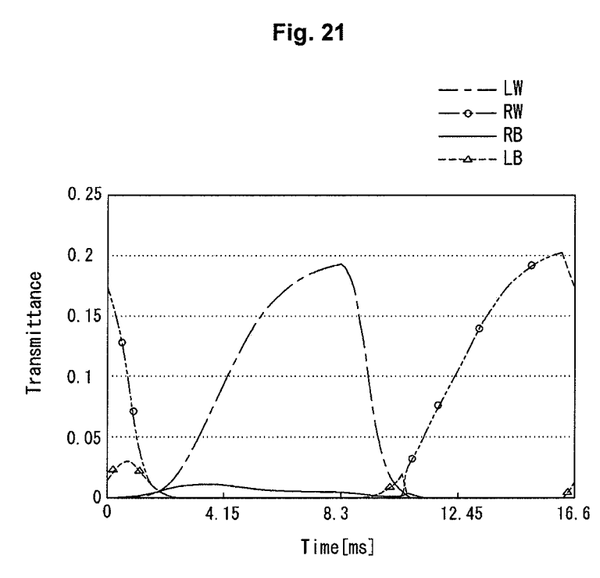
FIG. 21 is a graph showing white and black transmittance response characteristics of the left and right eyes according to an exemplary embodiment of this document.

In the exemplary embodiment, a prediction value for leveling the difference in the transmittance and crosstalk between the left and right eyes according to an off timing of the polarization conversion device 160 is calculated. A method of calculating the prediction value may comprise, for example, a method of setting up an equation based on left eye white, left eye black, right eye white, right eye black, a total crosstalk of the left eye, a total crosstalk of the right eye, and so on and an experiment based on them. In the exemplary embodiment, the off timing of the polarization conversion device 160 was moved to the left on the time axis so that it was earlier than an off timing of the polarization conversion device 160 in the conventional method using one of the above methods. For example, assuming that the off timing of the polarization conversion device was '0.0 ms' as in FIG. 13(a) (i.e., the conventional driving method), the off timing of the polarization conversion device was moved to '−0.5 ms' as in FIG. 13(b) (a driving method according to the exemplary embodiment). From FIGS. 20 and 21, it can be seen that, when the off timing of the polarization conversion device was '−0.5 ms' as described above, the difference in the transmittance and a crosstalk level between the left and right eyes were dispersed and leveled. Referring to Table 3 below, it can be seen that the crosstalk (CT) of the left eye and the right eye was dispersed.

TABLE 3

|  | Left eye (L) | Right eye (R) |
| --- | --- | --- |
| Crosstalk (CT) | 5.56% | 5.46% |

When comparing Table 2 and Table 3, the crosstalks (CT) of the left eye and the right eye are about 3% and 18% in Table 2, whereas the crosstalks (CT) of the left eye and the right eye are about 6% in Table 3. Accordingly, it can be seen that the crosstalks (CT) of the left eye and the right eye in Table 3 are leveled to about 5.56% and 5.46%.

In the exemplary embodiment, corresponding scan lines 164 of the polarization conversion device 160 are turned on after a lapse of '2.0 ms' since a right-eye image is written in the subpixels (or the gate lines) of the display device 150 and corresponding scan lines 164 of the polarization conversion device 160 are turned off '−0.5 ms' earlier than when a left-eye image is written in the subpixels (or the gate lines) of the display device 150, based on the results determined in the experimental process. Accordingly, assuming the on and off timing durations of the gate lines Gm and Gm+1 formed in the display device 150 are '8.3 ms/8.3 ms', the on/off timing durations of the scan lines 164 formed in the polarization conversion device 160 become '10.8 ms/5.8 ms'.

As described above, in the exemplary embodiment, a case where the on and off timing durations of the scan lines 164 formed in the polarization conversion device 160 are moved before the left-eye image is written and after the right-eye image is written, respectively, has been described. However, in an alternative exemplary embodiment, the on and off timing durations of the scan lines 164 formed in the polarization conversion device 160 may be moved after a left-eye image is written and before a right-eye image is written, respectively, according to the display device 150 and the polarization conversion device 160. That is, the on and off timing durations of the scan lines 164 formed in the polarization conversion device 160 may become different so that the difference in the transmittance and a crosstalk level between the left and right eyes are dispersed and leveled according to the display device 150 and the polarization conversion device 160.

As described above, the on and off timings of the scan electrodes formed in the display device and the polarization conversion device are made different in order to make identical a response characteristic therebetween. Accordingly, this document is advantageous in that it can provide the stereoscopic image display device which is capable of preventing crosstalk from occurring between a right-eye image and a left-eye image displayed in the display device.

The foregoing embodiments and advantages are merely exemplary and are not to be construed as limiting this document. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, such limitation is not intended to be interpreted under 35 USC 112(6).

What is claimed is:

1. A stereoscopic image display device for implementing a three dimensional (3-D) image by displaying a first image data and a second image data in a time-dividing manner, the stereoscopic image display device comprising:
a display panel comprising a display substrate and a color filter substrate, the display panel being configured to display the first image data during an $N^{th}$ (where N is a positive integer) frame period and display the second image data during an $(N+1)^{th}$ frame period;

a polarization conversion substrate that is separate from the display panel and configured to convert light output from the display panel into a first polarized light in response to a first driving voltage during the $N^{th}$ frame period and convert light output from the display panel into a second polarized light in response to a second driving voltage during the $(N+1)^{th}$ frame period; and a driving unit configured to receive signals from a first control unit and a second control unit and supply the first and second driving voltages to scan lines formed in the polarization conversion substrate, wherein the first control unit is configured to control scanning of gate lines formed in the display panel, wherein the second control unit is configured to control scanning of the scan lines formed in the polarization conversion substrate, and wherein a phase of a point of time at which scanning of at least one of the first and second image data starts is differently synchronized with a phase of a point of time at which scanning of at least one of the first and second driving voltage starts.

2. The stereoscopic image display device of claim 1, wherein the first control unit controls the gate lines such that the first image data starts being scanned at the display device at a point of time at which the $N^{th}$ frame period starts and the second image data starts being scanned at the display device at a point of time at which the $(N+1)^{th}$ frame period starts.

3. The stereoscopic image display device of claim 1, wherein the second control unit controls the scan lines such that the first driving voltage starts being scanned at the polarization conversion device at a point of time which is earlier by a predetermined time than a point of time at which the $N^{th}$ frame period starts.

4. The stereoscopic image display device of claim 1, wherein the second control unit controls the scan lines such that the second driving voltage starts being scanned at the polarization conversion device at a point of time which is delayed by a predetermined time from a point of a point of time at which the $(N+1)^{th}$ frame period starts.

5. The stereoscopic image display device of claim 1, wherein the second control unit controls the scan lines such that the first driving voltage starts being scanned at the polarization conversion device at a point of time which is delayed by a predetermined time from a point of which at which the $N^{th}$ frame period starts.

6. The stereoscopic image display device of claim 1, wherein the second control unit controls the scan lines such that the second driving voltage starts being scanned at the polarization conversion device at a point of time which is earlier by a predetermined time than a point of which at which the $(N+1)^{th}$ frame period starts.

7. The stereoscopic image display device of claim 1, wherein durations of on/off timings of the gate lines which are scanned by the first control unit and durations of off/on timings of the scan lines which are scanned by the second control unit differ within at least one frame period.

8. The stereoscopic image display device of claim 1, wherein the scan lines and the gate lines are classified and arranged in a same direction so that the scan lines and the gate lines have a corresponding relation of 1:N stages (where N is an even number).

9. The stereoscopic image display device of claim 1, wherein:
the first image data comprises left-eye image data supplied to the display device, and
the second image data comprises right-eye image data supplied to the display device.

10. The stereoscopic image display device of claim 1, further comprising:
an additional driving unit including a gate driving circuit and a data driving circuit configured to receive image data from the first control unit and output gate pulses to the gate lines and data voltages to data lines, the gate lines and the data lines both being formed in the display panel.

* * * * *